Figure 1:
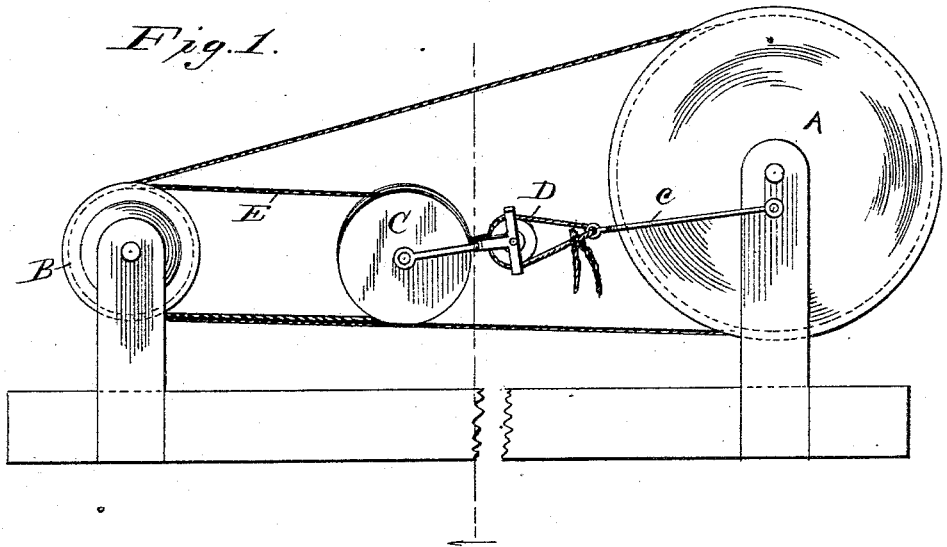

(No Model.)

A. F. HILLSTROM.
DEVICE FOR TRANSMITTING MOTION.

No. 425,543. Patented Apr. 15, 1890.

Witnesses
E. S. Newman,
Alw. S. Stewart.

Inventor
Alfred F. Hillstrom,
By his Attorneys
Louis Feeser & Co

UNITED STATES PATENT OFFICE.

ALFRED FREMONT HILLSTROM, OF EAST UNION, MINNESOTA.

DEVICE FOR TRANSMITTING MOTION.

SPECIFICATION forming part of Letters Patent No. 425,543, dated April 15, 1890.

Application filed July 27, 1889. Serial No. 318,950. (No model.)

*To all whom it may concern:*

Be it known that I, ALFRED FREMONT HILLSTROM, a citizen of the United States, residing at East Union, in the county of Carver and State of Minnesota, have invented certain new and useful Improvements in Devices for Transmitting Motion; and I do hereby declare the following to be a full, clear, and exact description of the same, reference being had to the accompaning drawings, forming a part of this specification, and to the letters of reference marked thereon.

This invention relates to devices for transmitting power from a motor to a mechanism to be driven through the medium of a cable or belt, the especial adaptation of the device being to transmit the power from a portable engine to a thrashing-machine, saw-mill, or other similar mechanism. Such mechanisms, it is well known, are liable to be located out of a proper line or to work out of a proper line, causing the cable or belt to run to one side or off the pulley, or, when used in the open air, to be blown off or injured by rain or friction, caused by the wind, or slip, caused by being wet. Power-transmitting devices of this character as hereinbefore constructed, it has been found, are frequently damaged and their efficiency greatly impaired by the causes mentioned, thrashing plants being frequently shut down on account of the trouble caused by the wind blowing off the belt and either destroying a valuable belt or else throwing it off the pulleys entirely. This has led to the practice of stretching canvas on the windward side of the belt, particularly where the belt is a long one and of sufficient width to transmit the necessary power to drive heavy machinery.

It is the object of my present invention to overcome the defects pointed out and to provide power-transmitting mechanism which will not be affected at all, or at least not injuriously affected, by the winds or storms to which it may be exposed, and which will transmit the power well, even though the pulleys be out of line or very widely separated, and the parts of which liable to wear or be destroyed can be renewed at a cost far below the cost of an ordinary flat belt.

The invention consists therefore, primarily, in an improved power-transmitting device in which the two pulleys employed have a series of grooves in their faces, with an intermediate idler and a continuous cable or rope passing around from one pulley to the other as many times as desired, according to the amount of power to be transmitted.

The invention consists, secondly, in certain novel details of construction and combinations and arrangements of parts, as will be hereinafter described, and pointed out in the claim at the end of this specification.

Figure 2:
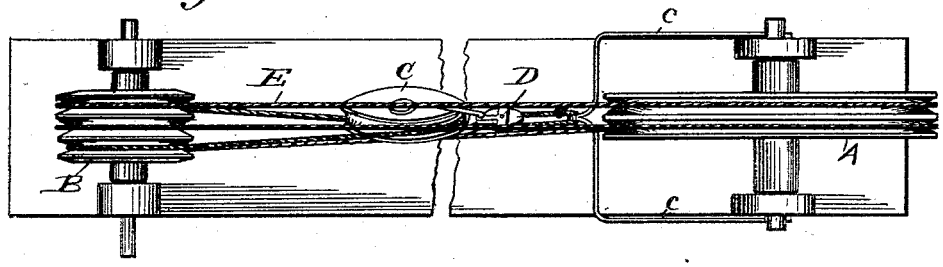
Figure 3:
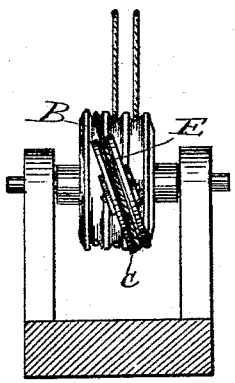

In the accompanying drawings, Figure 1 is a side elevation of a power-transmitting device constructed in accordance with my invention. Fig. 2 is a top plan view. Fig. 3 is a sectional view looking toward the counter-pulley.

Similar letters of reference in the several figures indicate the same parts.

The letter A indicates the power-pulley, and B the counter-pulley to which the power is transmitted, each having a series of grooves in its periphery to correspond to the number of strands of cable it is necessary to employ to transmit the desired power from one pulley to the other, the smaller one B, however, being provided with an extra groove, for a purpose to be presently explained.

Between the drive-pulley A and counter-pulley B is an idler-pulley C, preferably suspended from suitable posts, which support the drive-pulley by means of a yoke c, having bearings for the idler-pulley and a means for attachment to a cable-support—such as the block and tackle D or other loose adjustable connection—for drawing the idler-pulley away from the pulley B to tighten the cable E, which is passed around the pulleys A and B as many times as desired, and a loop then passed from the top of one of the outer grooves in pulley B to the bottom of the other outer groove. This method of coupling the pulleys enables a continuous belt to be employed and passed back and forth from one pulley to the other as often as necessary to transmit the desired power, with each loop in a separate groove and no friction between the different strands of the belt, even where the loop is returned from one side of the pulley to the other by the idler-pulley, which, it will be noted, stands diagonally, and is preferably of such thickness as that, even should the same-sized drive and counter pulleys be employed, the sides of the idler-pulley would be away from the adjacent strands, as will be understood upon reference to Fig. 3.

It is obvious that the power and counter pulleys may have a large number of grooves and the cable given only as many turns as desired in order to provide for contingencies which may require the transmission of a greater amount of power, and the idler, being mounted on a swinging support, is enabled to accommodate itself and make the loop pass from any groove to the other, and also serve as a most efficient tightener, permitting the power and counter pulleys to be widely separated or coupled very close, as the case may be, without necessitating the employment of different cables or causing undue friction, and that irrespective of the number of strands or loops passed around the power and counter-pulleys.

Without the grooves to separate and properly space the strands or loops it would be practically impossible to employ a large number by reason of the friction and liability of the loops to overlap or create friction, and should a flat belt be used the difficulty would be increased many times and the employment of more than one loop be impossible; nor in this instance could a loosely-supported idler be employed, as any accidental turning would lap the belt and stop the apparatus. Such objectionable constructions I do not wish to be understood as claiming; but What I do claim as my invention, and desire to secure by Letters Patent, is—

In a device for transmitting power, the combination, with the power and counter pulleys having the series of grooves therein, the intermediate grooved idler-pulley, and the cable passing around the power and counter pulleys two or more times and from the outer grooves of the counter-pulley around the idler-pulley, of the yoke $c$, connected to the drive-pulley support, and the cable and pulley connecting said yoke and idler-pulley, substantially as described.

In testimony whereof I have hereunto set my hand in presence of two subscribing witnesses.

ALFRED FREMONT HILLSTROM.

Witnesses:
 LOUIS FEESER, Jr.,
 FR. F. WILDE.